US007231285B2

(12) United States Patent
Noguchi

(10) Patent No.: US 7,231,285 B2
(45) Date of Patent: Jun. 12, 2007

(54) DATA RECORDING APPARATUS AND DATA RECORDING METHOD

(75) Inventor: Kiyoshige Noguchi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 83 days.

(21) Appl. No.: 11/065,457

(22) Filed: Feb. 25, 2005

(65) Prior Publication Data

US 2005/0190469 A1 Sep. 1, 2005

(30) Foreign Application Priority Data

Feb. 27, 2004 (JP) .......................... P2004-055043

(51) Int. Cl.
*G01M 17/00* (2006.01)

(52) U.S. Cl. .......................................... 701/35; 701/33

(58) Field of Classification Search ............ 701/29–35
See application file for complete search history.

(56) References Cited

U.S. PATENT DOCUMENTS 5,325,082 A * 6/1994 Rodriguez .................. 340/438
6,947,797 B2 * 9/2005 Dean et al. .................... 700/79
2002/0035422 A1 * 3/2002 Sasaki .......................... 701/35
2005/0083404 A1 * 4/2005 Pierce et al. ................ 348/148

FOREIGN PATENT DOCUMENTS

JP 2002-70637 3/2002

* cited by examiner

*Primary Examiner*—Mark Hellner
(74) *Attorney, Agent, or Firm*—McGinn IP Law Group, PLLC

(57) ABSTRACT

A data recording apparatus acquires vehicle data on a time-series basis. Then, a series of vehicle data, which satisfy predetermined acquiring conditions and are collected in a predetermined period from time-series vehicle data acquired by a data acquiring unit are recorded in a data recording unit, while being correlated with time information. The data acquiring unit continues to acquire the vehicle data while a data controlling unit records a series of the vehicle data in the data recording unit.

15 Claims, 6 Drawing Sheets

FIG. 3

| MODE FILE | ACQUIRED CONTENTS | ACQUIRING CONDITION | OPERATING CONDITION |
|---|---|---|---|
| A | 1. ENGINE SPEED<br>2. VEHICLE SPEED<br>3. INTAKE PIPE PRESSURE<br>4. IGNITION ADVANCED ANGLE<br>5. FUEL INJECTION INTERVAL<br>6. IDLE CONTROL VALVE CONTROL AMOUNT<br>7. ENGINE COOLANT TEMPERATURE | TRIGGER CONDITIONS:<br>(1) ENGINE SPEED = 0rpm<br>(2) CHANGED AMOUNT OF ENGINE SPEED EXCEEDS PREDETERMINED VALUE<br>RECORDING TIME:<br>(1), (2) 10 MIN. BEFORE AND AFTER CONDITIONS ARE SATISFIED<br>SAMPLING RATE:<br>(1) HIGHEST<br>(2) HIGHEST | (i) END TIMING OF ECU<br>(ii) COMPLETION OF DATA RECORDING |
| B | 1. ENGINE SPEED<br>2. VEHICLE SPEED<br>3. INTAKE PIPE PRESSURE<br>4. IGNITION ADVANCED ANGLE<br>5. FUEL INJECTION INTERVAL<br>6. IDLE CONTROL VALVE CONTROL AMOUNT<br>7. ENGINE COOLANT TEMPERATURE<br>8. STARTING FUEL CONTROL<br>9. STARTING IGNITION CONTROL<br>10. BATTERY VOLTAGE | TRIGGER CONDITIONS:<br>(1) ON OF IGNITION SWITCH (OR TURN ON OF RECORDING SYSTEM)<br>RECORDING TIME:<br>(1) 10 MIN. AFTER CONDITIONS ARE SATISFIED<br>SAMPLING RATE:<br>(1) 1 MIN. FROM START OF RECORDING →HIGHEST, 1 MIN. TO 10 MIN. →EVERY 1 SEC. | (i) END TIMING OF ECU<br>(ii) COMPLETION OF DATA RECORDING |
| C | 1. ENGINE SPEED<br>2. VEHICLE SPEED<br>3. INTAKE PIPE PRESSURE<br>4. IGNITION ADVANCED ANGLE<br>5. FUEL INJECTION INTERVAL<br>6. G SENSOR VALUE<br>7. AT GEAR POSITION<br>8. IGNITION LEARNED VALUE (LEARNING MAP)<br>9. FUEL LEARNED VALUE (LEARNING MAP)<br>10. PEROPHERAL INFORMATION | TRIGGER CONDITIONS:<br>(1) MISFIRE DECISION<br>(2) START AND END OF DATA ACQUISITION (CONTENTS 8, 9, 10)<br>RECORDING TIME:<br>(1) 10 MIN. BEFORE CONDITIONS ARE SATISFIED<br>(2) ONCE WHEN CONDITIONS ARE SATISFIED<br>SAMPLING RATE:<br>(1) HIGHEST | (i) END TIMING OF ECU<br>(ii) COMPLETION OF DATA RECORDING |
| D | 1. ENGINE SPEED<br>2. VEHICLE SPEED<br>3. INTAKE PIPE PRESSURE<br>4. IGNITION ADVANCED ANGLE<br>5. FUEL INJECTION INTERVAL | TRIGGER CONDITIONS:<br>(1) MIL TURNED ON<br>RECORDING TIME:<br>(1) 10 MIN. BEFORE AND AFTER CONDITIONS ARE SATISFIED<br>SAMPLING RATE:<br>(1) EVERY 1 SEC. | (i) END TIMING OF ECU<br>(ii) COMPLETION OF DATA RECORDING |
| ⋮ | ⋮ | ⋮ | ⋮ |

DATA RECORDING APPARATUS AND DATA RECORDING METHOD

This application claims foreign priority based on Japanese patent application No. JP-2004-055043, filed on Feb. 27, 2004, the contents of which is incorporated herein by reference.

BACKGROUND OF THE INVENTION

The present invention relates to a data recording apparatus and the method thereof and, more particularly, an approach method for recording vehicle data including control parameters in a control unit equipped in a vehicle.

In the prior art, in order to identify faulty conditions of the vehicle, known is the data recording apparatus for downloading the control parameters of the control unit equipped in the vehicle, and then recording such parameters. For example, disclosed in JP-A-2002-070637 is the data recording apparatus for efficiently recording the data of the control unit without a fail by utilizing effectively a limited memory capacity. In the data recording apparatus of JP-A-2002-070637, various data (i.e., the control parameters) in the control unit on the vehicle side are sampled on a time-series basis, and then acquired sampling data are stored in an SRAM as required. Then, when satisfied are predetermined trigger conditions equivalent to the conditions under which the data that are useful for identifying the faulty condition of the vehicle will be obtained, a series of the sampling data stored in the SRAM are downloaded, and then such data are stored in the data recording unit. However, in the data recording apparatus of JP-A-2002-070637, since the sampling of the control parameters is restricted by a time, such sampling of the control parameters is stopped temporarily while the sampling data are stored in the data recording unit.

According to the prior art described above, such data cannot be acquired due to the above periodical restriction even though the data are useful for identifying the faulty condition of the vehicle. Such a situation will be produced in the case where the subsequent trigger conditions are satisfied once again while previous data are still being downloaded in the data recording unit after the preceding trigger conditions are satisfied. In this case, the sampling itself of the control parameters is interrupted forcedly owing to the satisfaction of the preceding trigger conditions. Therefore, even if the subsequent trigger conditions are satisfied in the middle of this interruption, the sampling data themselves cannot be acquired, and of course such data cannot be stored in the data recording unit. As a result, when the trigger conditions are satisfied successively, the recording failure of the necessary data will occur, and therefore reduction in a reliability of the recorded data will be brought about.

SUMMARY OF THE INVENTION

The present invention has been made in view of such circumstances, and an object of the present invention is to suppress a recording failure of data that are useful for identifying a faulty condition of a vehicle, and to improve a reliability of recorded data.

In order to overcome such problems, a first aspect of the present invention provides a data recording apparatus that records vehicle data including control parameters in a control unit, which is equipped in the vehicle, into a data recording unit that an affiliated system can access. The data recording apparatus comprises a data acquiring unit for acquiring the vehicle data on a time-series basis; and a data controlling unit for recording a series of the vehicle data, which satisfy predetermined acquiring conditions and are collected in a predetermined period, out of time-series vehicle data acquired by the data acquiring unit in the data recording unit, while being correlated with a time information. Further, in the data recording apparatus, the data acquiring unit still continues to acquire the vehicle data while the data controlling unit records a series of the vehicle data in the data recording unit.

Here, in the first aspect, it is preferable that the data controlling unit should have a full-recording mode in which a series of the vehicle data acquired by the data acquiring unit are recorded in the data recording unit irrespective of the acquiring conditions while being correlated with the time information, and can switch a recording mode to the full-recording mode if necessary. Also, it is preferable that the data recording apparatus further comprises a random access memory for recording the time-series vehicle data acquired by the data acquiring unit; and wherein the data controlling unit records a series of the vehicle data recorded in the random access memory in the data recording unit.

In the first aspect, it is preferable that the data recording apparatus further comprises a communication unit for informing of a recording completion when the recording into the data recording unit is completed. Also, it is preferable that the data acquiring unit further acquires learned values that are learned by the control unit and changed in response to a driving condition of the vehicle or a peripheral information of the vehicle as the vehicle data.

A second aspect of the present invention provides a data recording method that records the vehicle data including control parameters in a control unit, which is equipped in the vehicle, into the data recording unit that the affiliated system can access. This data recording method comprises a first step of acquiring the vehicle data on a time-series basis; and a second step of recording a series of the vehicle data, which satisfies predetermined acquiring conditions and are collected in a predetermined period, out of acquired time-series vehicle data in the data recording unit, while being correlated with the time information. In the method, the first step still continues to acquire the vehicle data while a data controlling unit records a series of the vehicle data in the data recording unit.

It is preferable that the second step should have a full-recording mode in which a series of the acquired vehicle data are recorded in the data recording unit irrespective of the acquiring conditions while being correlated with the time information, and can switch a recording mode to the full-recording mode if necessary. Also, it is preferable that the data recording method further comprises a step of recording the acquired time-series vehicle data in a random access memory; and wherein the second step records a series of the vehicle data recorded in the random access memory in the data recording unit. In addition, it is preferable that the data recording method further comprises a step of informing of the recording completion when the recording into the data recording unit is completed.

According to the present invention, a series of the vehicle data, which satisfy predetermined acquiring conditions and are collected in a predetermined period, out of the control parameters that are outputted from the control unit on a time-dependent basis are recorded in the data recording unit. In this case, the acquisition of the control parameters is still continued during a series of the vehicle data are recorded in the data recording unit. Therefore, even in the case where the acquiring conditions are still continued, it is possible to suppress the occurrence of such a situation that the recording of the vehicle data is failed. As a result, the failure of the data recording that are useful for identifying the faulty condition of the vehicle can be prevented, and thus an improvement of the reliability of the recorded data can be achieved.

BRIEF DESCRIPTION OF THE DRAWINGS

FIG. 3 is the explanatory view showing an example of mode files.

DESCRIPTION OF THE PREFERRED EMBODIMENTS

Figure 1:
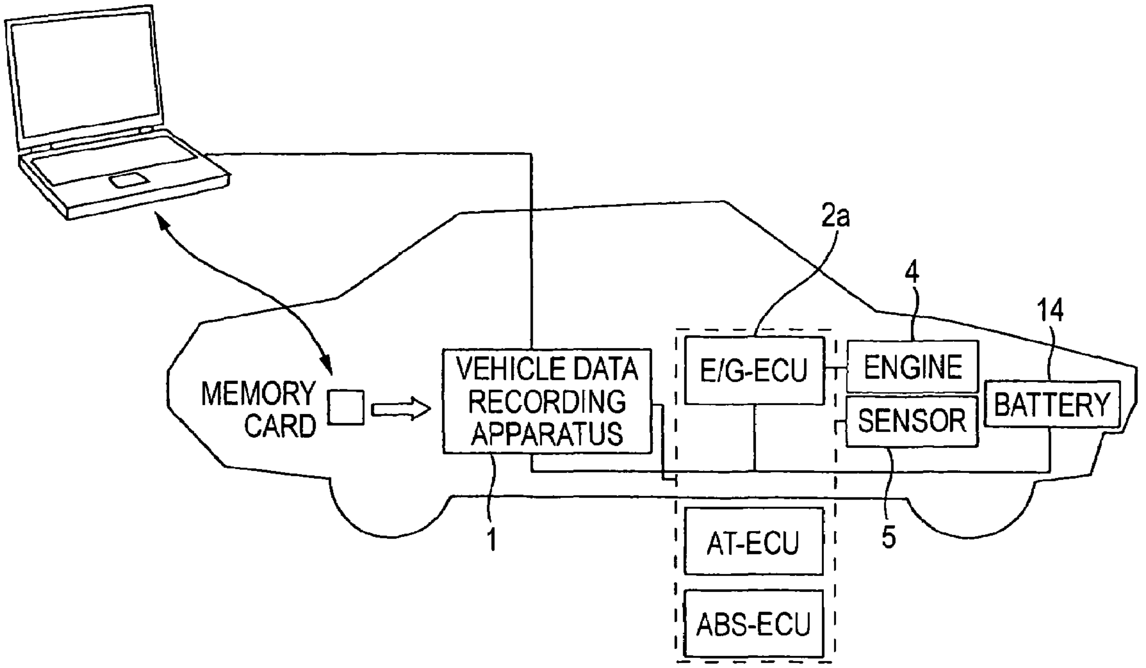
FIG. 1 is an explanatory view of a vehicle to which a data recording apparatus according to an embodiment of the present invention is applied.

FIG. 1 is an explanatory view of a vehicle to which a data recording apparatus according to an embodiment of the present invention is applied. First, prior to an explanation of a data recording apparatus 1 (referred simply as a "recording apparatus" hereinafter), the vehicle to which the recording apparatus 1 is applied will be explained hereunder. An electronic control unit 2 (referred as an "ECU" hereinafter) for executing a control of various units is provided in the vehicle. The ECU 2 is structured mainly with a microcomputer. In the present embodiment, an engine control unit 2*a* (referred simply to as an "E/G-ECU" hereinafter) for executing the control of an engine 4 will be explained mainly as the typical unit hereunder. However, the present invention can be applied similarly to a transmission control unit (AT-ECU) for executing the control of an automatic transmission, an ABS control unit (ABS-ECU) for executing the control of the anti-lock brake system, and the like. In this application, the term "ECU" is used to signify a general term for these control units.

In order to detect the conditions of the controlled object, signals from various sensors 5 are inputted into the ECU 2. As the sensors 5 of this type, there may be listed as, for example, an intake air volume sensor, a boost pressure sensor, a speed sensor, an engine speed sensor, a coolant temperature sensor, an acceleration sensor (G sensor), and the like. The ECU 2 executes calculations regarding to various controlled variables in compliance with previously-setted control programs, based on the signals. Then, the controlled variables calculated by this calculation are outputted to various actuators. For example, the E/G-ECU 2*a* executes the calculation about fuel injection intervals (a fuel injection quantity), an ignition timing, a throttle opening degree, etc. and then outputs the control signals to various actuators in response to the calculated controlled variables, and so on. Respective ECU's 2 incorporated into the vehicle are connected mutually via a K-line (one serial communication standard) or a CAN (Controller Area Network), and these ECU's 2 can share mutual informations by executing a serial communication via corresponding communication lines. In this case, all the signals are not always inputted commonly into respective control units constituting the ECU 2. The signals required for individual control units are enough to execute the control.

Also, a self-diagnosis program used to diagnose faults of each portion in the controlled object is incorporated into the ECU 2, and automatically diagnoses operating conditions of the microcomputer, the sensors 5, etc. at an appropriate time period. When the fault is found by the diagnosis, the ECU 2 generates a diagnosis code to deal with fault contents and then stores the code in a predetermined address of a back-up RAM in the ECU 2. Also, the ECU 2 executes an alarming process such that the MIL lamp is caused to turn ON or turn ON/OFF, or the like, as required.

Next, the data recording apparatus 1 according to the present embodiment will be explained hereunder. The recording apparatus 1 is a system that can be detachably attached to record the various data about the vehicle (referred to as "vehicle data" hereinafter), and is equipped in the vehicle, as required. Control parameters of the ECU 2 may be considered as the "vehicle data" that the data recording apparatus 1 records. Here, typically controlled variables calculated in the ECU 2 are assumed as the "control parameters", but the parameters (an engine speed (rpm), a vehicle speed (km/h), etc.) and learned values (learning control maps) used to calculate the controlled variables are also contained in the controlled variables. Also, the recording apparatus 1 can record the signals detected by various sensors 5 and the peripheral informations of the vehicle as the informations that accompany the control parameters. Here, the peripheral informations of the vehicle are the information about peripheral circumstances outside of the vehicle. An atmospheric temperature about the outside of the vehicle, an atmospheric pressure about the outside of the vehicle, an altitude and an absolute position (latitude/longitude) in a periphery of the vehicle, etc. correspond to such peripheral informations.

The case where a user brings the vehicle into a service shop when he or she found any troubles, or the like may be considered as the case where the recording apparatus 1 is incorporated into the vehicle. In the former case, the test run of the vehicle is carried out by a service man. In this case, the recording apparatus 1 acquires the vehicle data in a test run period on demand, and records the acquired vehicle data as required. Also, in the latter case, the vehicle is returned once to the user except for the case where the service man can easily identify the trouble. In this case, the recording apparatus 1 acquires the vehicle data at any time in the situation that the vehicle is normally driven by the user, and records the acquired vehicle data if necessary. After the test run conducted by the service man is finished or when the vehicle is carried into the service shop once again, the recording apparatus 1 is removed from the vehicle. Then, the vehicle data recorded in the recording apparatus 1 are employed in order to decide whether or not a malfunction occurred in the vehicle or to identify the cause of the malfunction.

Because the recording apparatus 1 is not always equipped in the vehicle, a specific mounting space is not provided beforehand in the vehicle, unlike the ECU 2. In the present embodiment, the recording apparatus 1 is installed into a passenger compartment, and is connected electrically to various cables provided to the vehicle side. Here, from the viewpoint of lessening the workload of the service man, it is preferable that the recording apparatus 1 should be fixed to the vehicle simply in a short time. Also, from the viewpoint of the safety, it is preferable that the recording apparatus 1 should be positioned not to obstruct driving operations of the driver. In addition, from the viewpoint of avoiding electrical connection failures, it is preferable that the recording apparatus 1 should be secured to the vehicle such that the recording apparatus 1 is not easily moved while driving the vehicle. In light of those respects, in the present embodiment, a hook and loop fastener (velcro strap) is used to tighten the recording apparatus 1 to a floor mat under the seat. As the result, the recording apparatus 1 can be fixed satisfactorily by this layout with excellent detachability not to obstruct the driving operation of the driver. In this case, as a means for fixing the recording apparatus 1 other than the use of the velcro strap, such recording apparatus 1 may be fixed to a seat frame under the seat via bolts, screws, etc.

Figure 2:
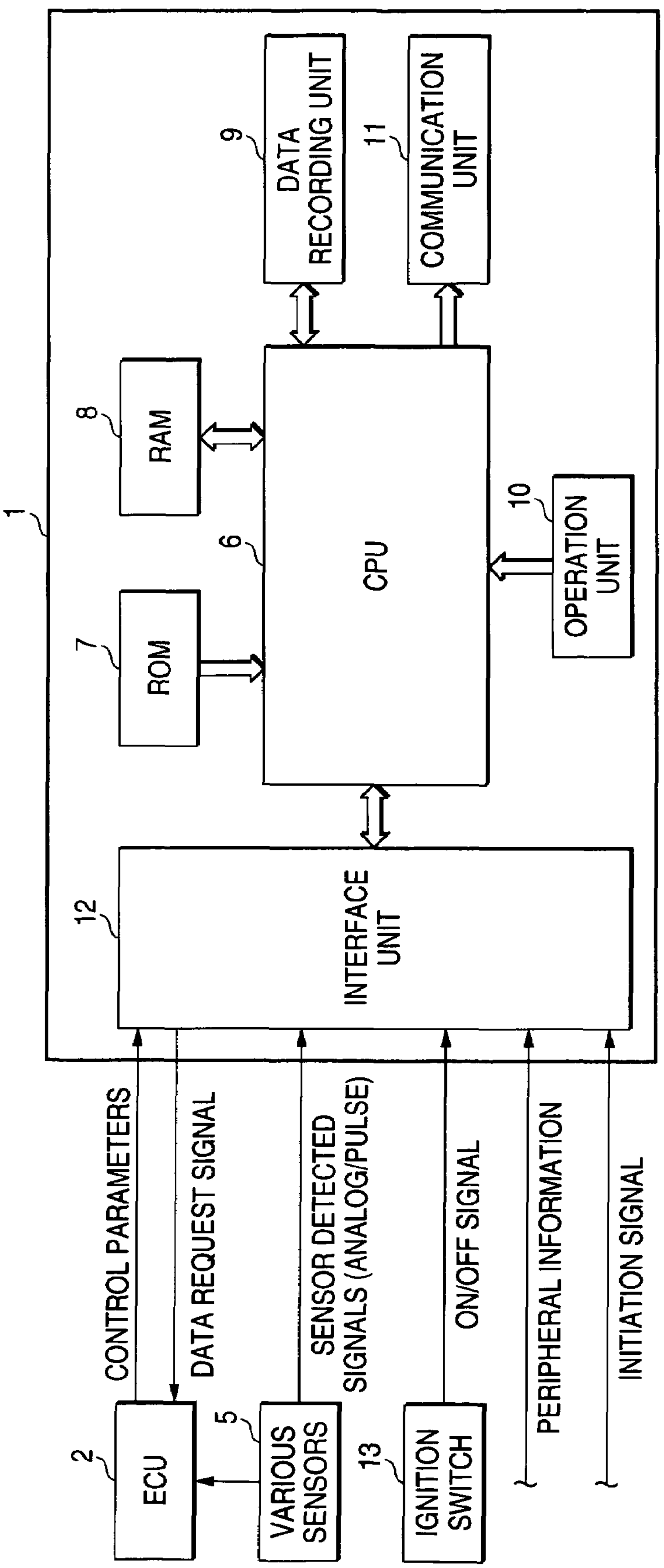
FIG. 2 is a block diagram showing a system configuration of a recording apparatus.

FIG. 2 is a block diagram showing a system configuration of the recording apparatus 1. The recording apparatus 1 is composed mainly of a CPU 6. Then, a ROM 7, a RAM 8, a data recording unit 9, an operation unit 10, a communication unit 11, and an interface unit 12 are connected to buses to the CPU 6. The CPU 6 conducts controls of the overall recording apparatus 1, and reads the control program stored in the ROM 7 and then executes the process in compliance with the program. The CPU 6 performs a function as an acquiring unit that acquires the vehicle data containing the control parameters outputted from the vehicle at a predetermined sampling rate on a time-series basis, and the function as a data controlling unit that records the acquired vehicle data in the data recording unit 9. The RAM 8 constitutes a work area that stores temporarily various process data executed by the CPU 6, etc., and also has the function as a buffer that records temporarily the vehicle data acquired on the time-series basis.

A series of the vehicle data recorded in the RAM 8 are recorded in the data recording unit 9 that the affiliated systems can access, on the assumption that the conditions described later are satisfied. In the present embodiment, with regard to the versatility of the data recorded in the data recording unit 9, the card type nonvolatile memory that can be detachably attached to the recording apparatus 1, e.g., the flash memory type memory card, is used as the data recording unit 9. For this purpose, the recording apparatus 1 has a socket (or a drive) via which the CPU 6 can access the memory card. In the case where the recording apparatus 1 is incorporated into the vehicle, the memory card is inserted into the socket by the service man. Thus, the CPU 6 can record the vehicle data on the memory card that is equivalent to the data recording unit 9, and can read the information recorded on the memory card. As the memory card of this type, various storing media such as SmartMedia, SD memory card, and so on can be used. The memory capacities of these memory cards are set variously in a range of 8 MB to 1 GB, and thus the memory card having a predetermined memory capacity can be used at a user's option.

The mode files read by the CPU 6 and used are recorded in advance in the memory card serving as the data recording unit 9. After the faulty conditions that are caused in the vehicle as the recorded object are assumed, the conditions applied to record the vehicle data useful for identifying the faulty conditions are set previous in the experiment or the simulation. That is, a basic information used when the recording apparatus 1 acquires/records the vehicle data are described in the mode files, and the recording apparatus 1 records the vehicle data in accordance with the mode files.

FIG. 3 is an explanatory view showing an example of the mode file. The mode file is composed of the acquired contents, the acquiring conditions, and the operating conditions. The acquired contents are the contents of the vehicle data as the recorded object. The acquiring conditions are the conditions that are applied to acquire/record the vehicle data in response to the acquired contents. A sampling rate, trigger conditions, a recording time, etc. correspond to the acquiring conditions. The sampling rate is the time period at which the vehicle data are collected, and various values are set in answer to the acquired contents. The vehicle data, a time-series time width of which is adjusted constantly (or variably) and which are continued on the time-series basis, can be collected by setting the sampling rate. The trigger conditions are the conditions that are applied to record the series of the acquired vehicle data from the RAM 8 to the data recording unit 9. As the trigger conditions, predetermined points (e.g., speed=0 km/h, engine speed=0 rpm, and the like) in a time-dependent transition of the vehicle data, a point of time when the ignition switch 13 is turned ON, the point of the time when the failure code such as the misfire decision on is generated, start and end points of the data acquisition, a point of time when the MIL lamp is turned ON, etc. may be listed. The recording time is a time length of the vehicle data that are recorded from the RAM 8 to the data recording unit 9. For example, 10 minute before and after the trigger conditions are satisfied, etc. may be listed. The operating condition is the condition under which the process goes to an ending operation (shutdown process described later) of the recording apparatus 1. Since the recording apparatus 1 must record the vehicle data in synchronism with the operation of the ECU 2, basically the operation end of the ECU 2 is set as the operating condition (the operating condition (i) in FIG. 3).

Here, when the vehicle data are recorded in the data recording unit 9 at a certain timing in accordance with the acquired contents and the acquiring conditions, such a situation may also be assumed (the completion of the data recording) that a mode satisfying the acquired contents and the acquiring conditions by no means appears in subsequent driving cycles. For example, like the mode file B shown in FIG. 3, in the case where to record the vehicle data only for 10 minutes from the ON of the ignition switch 13 is described as the acquiring conditions, the data recording is completed after the vehicle data collected over 10 minutes have been recorded in the data recording unit 9. In such a case, even though the operation of the ECU 2 is still continued, the situation in which the vehicle data are to be recorded is not generated and therefore there is little need of keeping the operation of the recording apparatus. Therefore, the completion of the date recording is also set as a secondary operating condition in the mode file (the operating condition (ii) in FIG. 3).

In an example shown in FIG. 3, a mode file A is such a mode file that a rough idle is assumed as the faulty condition. In accordance with the mode file A, the recording apparatus 1 continuously acquires the vehicle data such as the engine speed, the vehicle speed, an intake pipe pressure, an ignition advanced angle, a fuel injection interval, a controlled amount of a auxiliary air control valve, the coolant temperature, etc. at a highest (e.g., 10 msec.) sampling rate. Also, the vehicle data collected over 10 minutes before and after the timing at which the trigger conditions are satisfied are recorded in the data recording unit 9, while using as the trigger conditions the event that the engine speed becomes 0 rpm in a vehicle data collecting period. Alternately, the vehicle data collected over 10 minutes before and after the timing at which the trigger conditions are satisfied are recorded in the data recording unit 9, while using as the trigger conditions the event that a changed amount of the engine speed exceeds a predetermined value. Then, the recording apparatus 1 finishes the acquisition/recording of the vehicle data in principle under the condition that the operation of the ECU 2 is ended, and then the process goes to the shutdown process (when the data recording is completed, the process goes to the shutdown process at the timing of the completion). Meanwhile, a mode file B is such a mode file that the defective engine start is assumed as the faulty condition, and a mode file C is such a mode file that the abnormal vibration such as the surge, or the like is assumed as the faulty condition. In contrast, a mode file D is not prepared as the mode file in which the particular faulty condition is assumed, and can respond to broad applications that need the lowest minimum vehicle data in various faulty conditions.

A plurality of the files that correspond to different faulty conditions respectively are present in the mode files. Therefore, when the recording apparatus 1 is equipped in the vehicle, the mode files corresponding to the faulty conditions of the concerned vehicle must be selected appropriately as the assumption, and then such mode files must be recorded on the memory card. The selection of the mode files and the recording thereof on the memory card are executed beforehand by the service man while referring to the user's explanation of the faulty conditions and the diagnosis codes stored in the back-up RAM of the ECU 2.

The operation unit 10 is structured by a remote controller to which operation switches are provided. This remote controller can be operated by the driver. When the operation switch is operated by the driver, the operation signal is outputted from the operation unit 10 to the CPU 6. Thus, the CPU 6 records the vehicle data recorded in the RAM 8 in the data recording unit 9. In other words, the operation of the operation switches function as the trigger conditions given by the user at any timing. Also, the recording mode can be switched by operating the operation switches. This recording mode is a mode that points a recording mode of the vehicle data to the data recording unit 9, and two type modes, i.e., a memory-saving mode and a full-recording mode are present. The memory-saving mode is such a mode that a quantity of the data recorded in the data recording unit 9 is suppressed, and a series of the vehicle data that satisfy the predetermined acquiring conditions and are collected in a predetermined period are recorded in the data recording unit 9. Meanwhile, the full-recording mode is such a mode that the time-series vehicle data recorded in the RAM 8 are recorded in the data recording unit 9 at any time or every predetermined period irrespective of the acquiring conditions described in the mode file. Normally the recording mode is initially set to the memory-saving mode, and such recording mode is switched to the full-recording mode only when the driver's operation is performed. In this case, the operation unit 10 may further contain inputting means such as a keyboard, a mouse, etc.

When the recording of the vehicle data is completed satisfactorily, the communication unit 11 informs the user of the completion of recording. In the present embodiment, the communication unit 11 is structured mainly by the LEDs, and is controlled to turn ON or turn ON/OFF when the recording of the vehicle data that are described in the acquiring conditions is appropriately ended. Thus, the communication unit 11 can inform effectively the user of the recording completion of the vehicle data. In this case, the communication unit 11 may be composed of the CRT or the liquid crystal display, or the speaker, or the like, and various configurations that are capable of informing the driver of the recording completion may be employed.

The interface unit 12 contains various interfaces that can transfer the data on the vehicle. The recording apparatus 1 is connected to the CAN or the K-line on the vehicle via the interface unit 12, and can hold a two-way data communication with the ECU 2 on the vehicle. Thus, the recording apparatus 1 can acquire the control parameters from the ECU 2 and can grasp the situation of the ECU 2 such as the generation of the diagnosis code, or the like. Also, the output signals outputted from the various sensors provided to the vehicle may be inputted into the interface unit 12 directly or indirectly via the ECU 2, and also the signal (ON signal/OFF signal) that is generated in synchronism with the ON or OFF of the ignition switch 13 may be input into the interface unit 12. In addition, the recording apparatus 1 can execute the two-way communication with a general-purpose computer (affiliated PC) as the affiliated system attached externally via the interface unit 12.

The recording apparatus 1 is connected to the battery 14 mounted on the vehicle (see FIG. 1), and is operated by an electric power supplied from the battery 14. In this case, in order to maintain the power supply necessary for the operation of the recording apparatus 1 in the situation that the supply of the electric power is cut off, a sub-battery (not shown) is provided to the recording apparatus 1. For example, this sub-battery is composed of a capacitor that has a predetermined electrostatic capacity, or the like. The electric power accumulated in the sub-battery is supplied appropriately to various circuits constituting the recording apparatus 1 as soon as the electronic connection between the battery 14 and the recording apparatus 1 is cut. Also, although not shown in FIG. 2, a clock function of indicating a current day/time and a timer function of sensing a timing of the predetermined period are provided to this recording apparatus 1.

Figure 4:
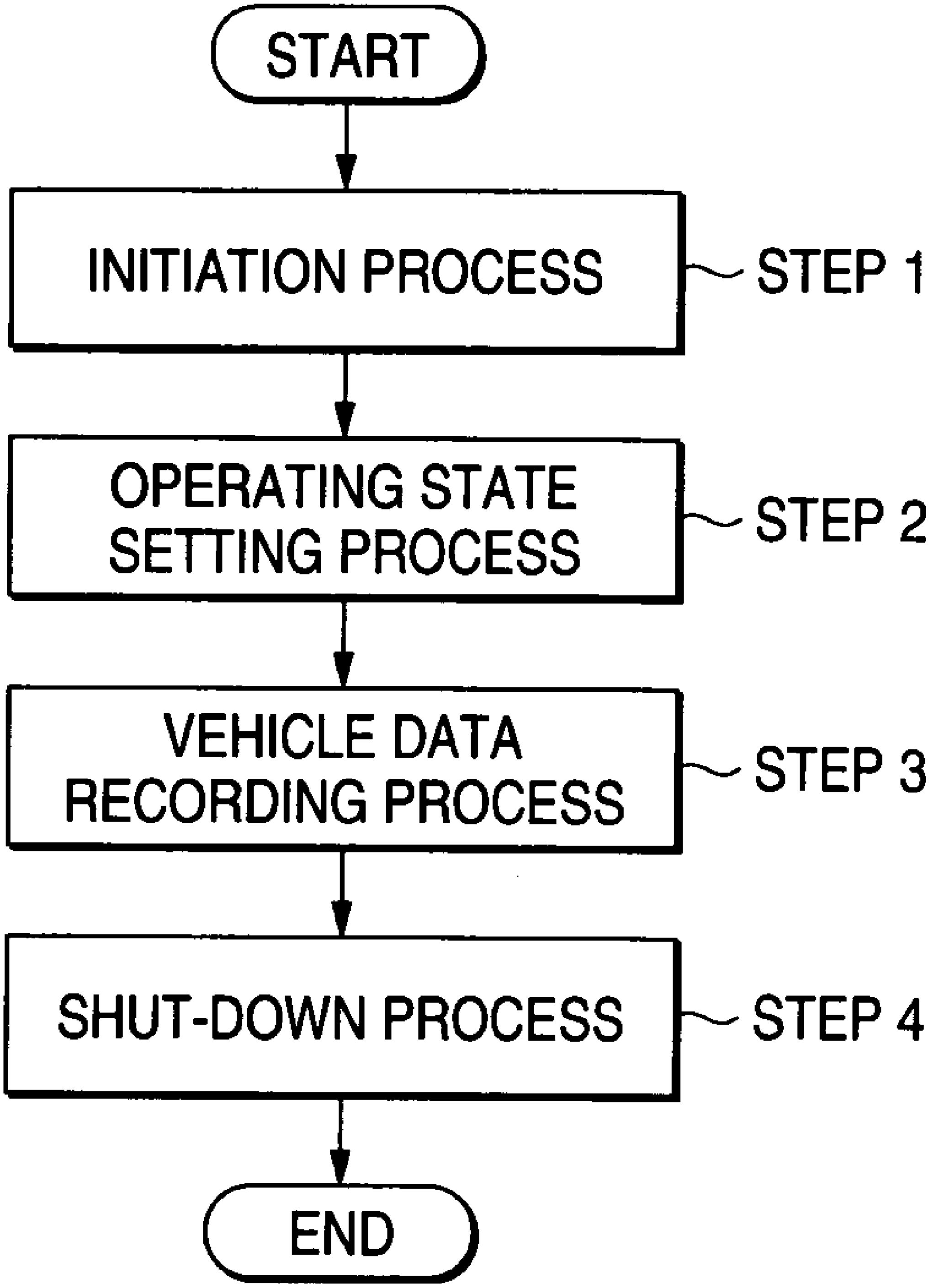
FIG. 4 is a flowchart showing procedures of recording the data according to the present embodiment.

FIG. 4 is the flowchart showing the procedures of recording the data according to the present embodiment. The procedure of the recording process executed by the recording apparatus 1 is advanced in order of an initiation process, an operating state setting process, a vehicle data recording process, and a shutdown process.

Initiation Process (Step 1)

From the viewpoint of achieving a reduction in a power consumption of the battery 14, the power supply of the recording apparatus 1 is basically turned OFF in the engine stop condition. When the engine 4 is started, the recording apparatus 1 turns ON its power supply automatically and starts the systems such as the operating system of the computer, etc. In this case, the system of the recording apparatus 1 should be preferably started prior to ON of the ignition switch 13 in order to execute the recording of the vehicle data as soon as the engine is started. Therefore, the recording apparatus 1 executes the initiation process by using either one of the following approaches 1) to 3) or plural approaches in combination.

*Approach 1 (Start Before ON of the Ignition Switch 13)

When the ignition switch 13 is turned ON, a getting-in action of the driver is present as the premise. Therefore, the recording apparatus 1 detects the getting-in action and then executes the initiation process. A getting-in action of the driver can be sensed on the basis of a signal of the smart key system, release of the door lock, sitting on the seat, touching the door, or a vibration of the vehicle due to open/close of the door, for example. When the getting-in action of the driver is sensed by the sensor, or the like and then the signal is inputted as a starting signal via the interface unit 12 in response to the action, this signal acts as a trigger and the power supply of the recording apparatus 1 is turned ON.

*Approach 2 (The Start in Synchronism with an ON Timing of the Ignition Switch 13)

When an ON signal output from the ignition switch 13 is inputted via the interface unit 12, the ON signal acts as the trigger and the power supply of the recording apparatus 1 is turned ON. Alternately, when a communication signal on the CAN is changed in the interface unit 12 owing to the ON of the ignition switch 13, this signal change acts as the trigger and the power supply of the recording apparatus 1 is turned ON.

*Approach 3 (The Start After ON of the Ignition Switch 13)

A timer signal is supplied to the recording apparatus 1 from a built-in timer (not shown) every predetermined time period. Then, this timer signal acts as the trigger and the power supply of the recording apparatus 1 is turned ON. When the system is started accompanying the ON of the power supply, the recording apparatus 1 outputs a data request signal to the ECU 2 on the vehicle. Since normally the ECU 2 is operating when the vehicle is started, the signal is outputted from the ECU 2 side in response to this data request signal. Therefore, the recording apparatus 1 decides whether or not the vehicle is now started, in response to whether or not the recording apparatus 1 received the signal from the ECU 2. When the recording apparatus 1 received the predetermined signal from the ECU 2, such recording apparatus 1 continues its started state. In contrast, when the recording apparatus 1 did not receive the predetermined signal from the ECU 2, the power supply is turned OFF once and the power supply is turned ON again in response to the input of the timer signal. Then, the similar processes are repeated.

In addition to the above, if a power supply switch is provided to a remote controller that corresponds to the operation unit 10, the user may execute the initiation process of the recording apparatus 1 before the ignition switch 13 is turned ON. In this case, an operating signal responding to the operation of the power supply switch acts as the trigger and the power supply of the recording apparatus 1 is turned ON.

Operating State Setting Process (Step 2)

When the system is started by turning ON the power supply, the operation conditions are setted on the basis of the mode file recorded in the data recording unit 9. More particularly, the acquired contents described in the mode file are read and then these contents are set as the vehicle data that are to be acquired from the vehicle, and also the acquiring conditions are read and then the conditions with regard to the acquisition/recording of the vehicle data are setted. As the result, the recording apparatus 1 is setted into the condition under which the system carries out the acquiring/recording operations in compliance with the mode file.

Once the setting by using the mode file is applied, an operation history is referred to in the subsequent setting processes. This operation history is the information that is recorded in the data recording unit 9 in the shutdown process (step 4 described later), and the operation state of the recording apparatus 1 at the time of preceding end is described in the operation history. The recording apparatus 1 is restored into the same operation state as that obtained at the time of preceding end by referring to this operation history. Therefore, since the continuity of the operation state of the recording apparatus 1 can be kept through respective driving cycles, the operation history is effective for the case where the data recording is executed over the plurality of cycles. As described later, only the lowest minimum contents required to restore the operation state into the same state as the operation state obtained at the time of preceding operation end are recorded in the operation history. For this reason, even if the operation state is restored by reading this operation history, the time necessary for that operation becomes short rather than the case where the mode file is read. As the result, even in the case where the vehicle data must be recorded immediately after the recording apparatus 1 is started, an improvement of a response ability to the recording operation of the recording apparatus 1 can be achieved.

Vehicle Data Recording Process (Step 3)

Figure 5:
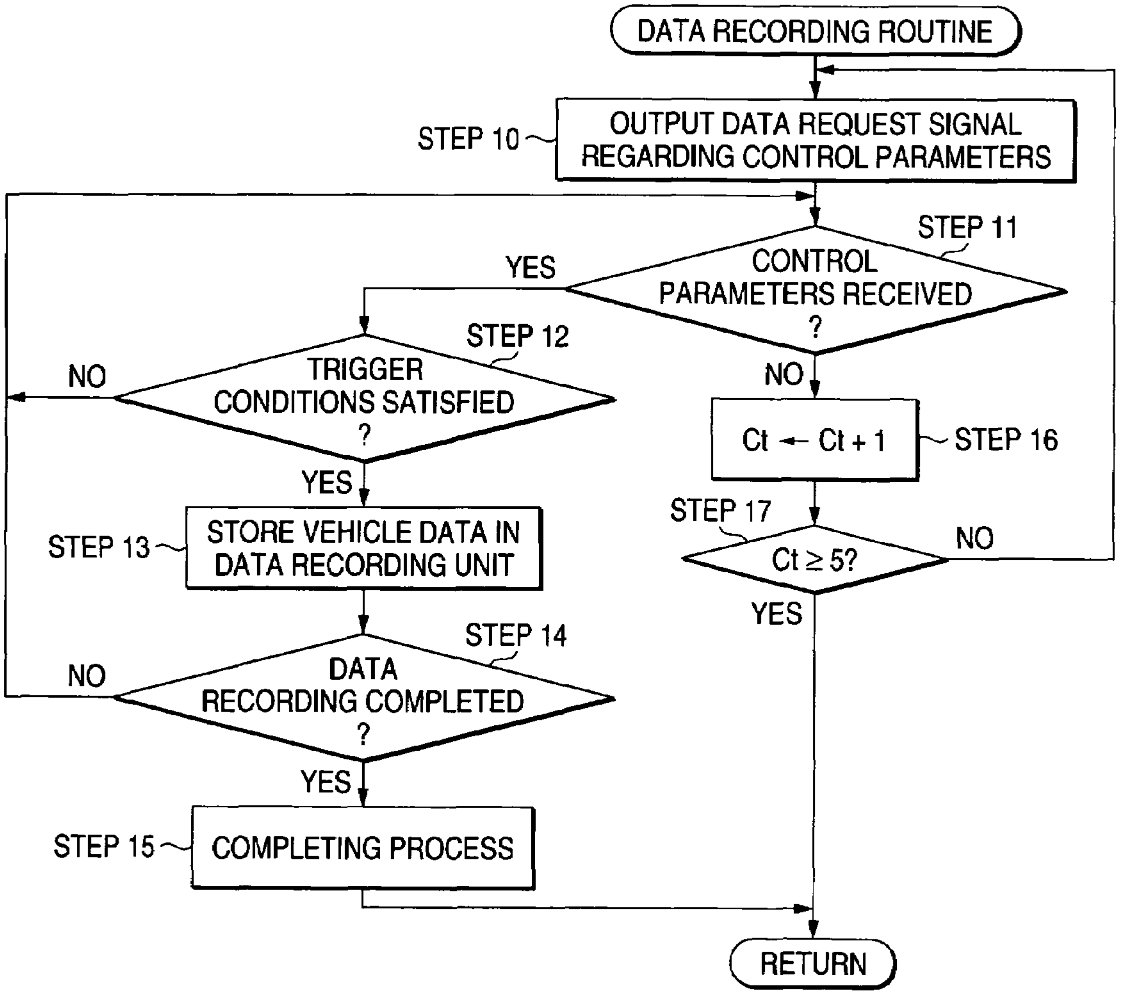
FIG. 5 is the flowchart showing detailed procedures of a data recording process in step 3.

FIG. 5 is the flowchart showing detailed procedures of the data recording process in step 3. When the operation state is set in the preceding step 2, first a data request signal is outputted to the ECU 2 to acquire the control parameters being setted as the acquired contents in step 10. The ECU 2 is executing the ordinary system control at the same time when the vehicle is started. When the ECU 2 received the data request signal, such that ECU 2 outputs the control parameters responding to the acquired contents to the recording apparatus 1 until its own operation is ended, while executing the system control.

In step 11, it is decided whether or not the recording apparatus 1 has received the control parameters. If it is decided negatively in step 11, i.e., if the recording apparatus 1 has not received the control parameters, the process goes to step 16 described later. On the other hand, if it is decided affirmatively in step 11, i.e., if the recording apparatus 1 has received the control parameters, the process goes to step 12. In this case, the received control parameters are acquired continuously at a predetermined sampling rate and then the acquired control parameters are recorded in the RAM 8 in the time-series basis. Also, if the vehicle data except the control parameters of the ECU 2, i.e., the signals, the peripheral information, etc. are contained in the acquired contents, the recording apparatus 1 also acquires the data via the interface unit 12 and records thereof in the RAM 8 in a time-series basis.

In this case, when the data corresponding to the acquired contents, e.g., the engine speed, is present in both the control parameters (calculated values) of the ECU 2 and the signals, the recording apparatus 1 can acquire the signals as well as the control parameters and record both data in the RAM 8. Also, if the sensors for sensing the peripheral information are provided individually together with the recording apparatus 1, the peripheral information can be acquired as the signals from the respective sensors. In this case, when the sensors (e.g., a thermometer, a GPS, etc.) capable of detecting the information are installed on the vehicle, the outputted signals may be utilized.

In step 12, it is decided whether or not the trigger conditions are satisfied. If it is decided negatively in the step 12, i.e., the trigger conditions are not satisfied, the process goes back to the step 11. On the other hand, if it is decided affirmatively in the step 12, i.e., if the trigger conditions are satisfied, a series of the vehicle data recorded in the RAM 8 are stored in the data recording unit 9 (step 13). For example, in the mode file A shown in FIG. 3, it is decided that, when the acquired engine speed becomes 0 rpm, the trigger conditions are satisfied. In this event, the vehicle data collected over 5 minutes before the timing at which the trigger conditions are satisfied are read from the RAM 8 and recorded in the data recording unit 9. In addition to this, the vehicle data recorded in the RAM 8 over 5 minutes after the timing at which the trigger conditions are satisfied are recorded in the data recording unit 9. In other words, the series of the vehicle data, which satisfy the predetermined acquiring conditions and are collected in a predetermined time period, out of the time-series vehicle data recorded in the RAM 8 are recorded in the data recording unit 9. In this case, the CPU 6 corresponding to the data acquiring unit still continues to acquire the vehicle data while the series of the vehicle data are recorded in the data recording unit 9.

Figure 6:
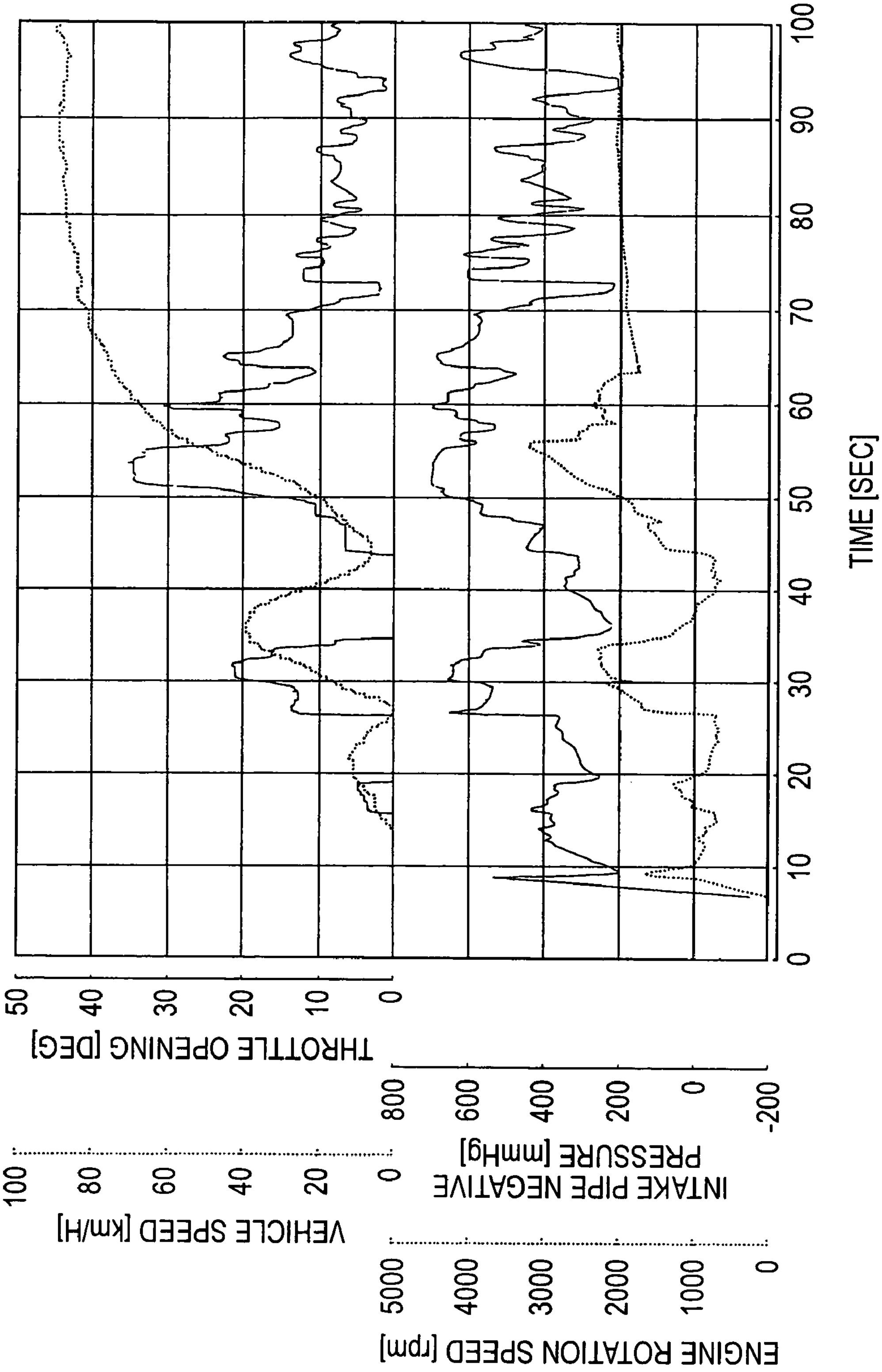
FIG. 6 is the explanatory view showing time-series transitions of vehicle data recorded in the data recording unit.

FIG. 6 is an explanatory view showing time-series transitions of the vehicle data recorded in the data recording unit 9. In FIG. 6, a vehicle speed (km/h), a throttle opening degree (deg), an engine speed (rpm), and an intake pipe negative pressure (mmHg) are shown as the vehicle data. As shown in FIG. 6, the vehicle data recorded in the data recording unit 9 are recorded to correlate with the time information upon the collection. As this time information, either an absolute time indicated by date/time or a relative time indicated by the time elapsed from the recording start is employed.

In step 14, it is decided whether or not the data recording is completed, i.e., the recording that satisfies the acquiring conditions perfectly is executed, by the recording operation in step 13. If it is decided negatively in step 14, i.e., the data recording is not completed, the process goes back to the step 11. On the other hand, if it is decided affirmatively in the step 14, i.e., the data recording is completed, the process goes to step 15. In the step 15, a completing process of the recording operation is executed, and then the process exits from the data recording routine. In the completing process, the communication unit 11 is controlled to turn ON the LED and also the collection of the vehicle data output from the ECU 2 is stopped.

Meanwhile, in step 16, a value of a counter Ct is incremented by "1". The counter Ct counts the number of the times where the control parameters are not received although the data request signal was outputted to the ECU 2. Thus, the counter Ct is set to "0" in an initial routine that is executed in starting the system of the recording apparatus 1. In step 17 following step 16, it is decided whether or not the value of the counter Ct came up to a predetermined value ("5" in the present embodiment). The reason why the decision shown in step 17 is provided is to decide whether or not the operation of the ECU 2 finishes, for the process must go to the shutdown process at the timing when the operation of the ECU 2 finishes. As given in the operation conditions in the mode file, the data recording process finishes simultaneously with the end of operation of the ECU 2 as the recorded object except the case where the data recording is completed in one driving cycle. Normally operation end timings are setted individually in the respective control units constituting the ECU 2. For example, the ABS-ECU finishes the operation at the timing when the ignition switch 13 is turned OFF whereas the E/G-ECU **2*a* still operates for a certain time after the ignition switch 13 is turned OFF, and then finishes the operation. In this way, since the operation end timings are different in response to the ECU 2 as the recorded object, the operating situation of the ECU 2 must be monitored by the recording apparatus 1 itself to cause the data recording process to finish at an appropriate timing. For this reason, in the present embodiment, the end of the operation of the ECU 2 is decided under the condition that the data request signal is outputted but no vehicle data are received from the ECU 2. In this case, since it may be considered that the service (or a communication process) of the ECU 2 is interrupted temporarily, the recording apparatus 1 outputs the data request signal for the predetermined number of the times. Then, if the data have never been received yet (the counter $Ct \geqq 5$) after the data request signal is outputted for the predetermined number of times, the process exits from the data recording routine in response to the affirmative decision in step 17**.

Now, the recording apparatus 1 monitors a power supply line connected to the battery 14 while such system executes a series of such data recording process. When the power supply is turned OFF, the process goes to the shutdown process in the step 4. In this case, an electric power is supplied from a sub-battery (not shown) and the recording apparatus 1 is operated by this power.

Shutdown Process (Step 4)

The shutdown process is the process that turns OFF the power supply of the recording apparatus 1. In this shutdown process, first the current operational state of the recording apparatus 1 is checked to execute safely the turn-OFF of the power supply. According to this check, the operational state of the recording apparatus 1 is classified into any state of "in the collection of the vehicle data", "in the recording of the vehicle data", or "the completion of the data recording". Here, the state "in the collection of the vehicle data" corresponds to the state in which the trigger conditions are not satisfied and the recording apparatus 1 is now acquiring the data from the vehicle side. The state "in the recording of the vehicle data" corresponds to the state in which the trigger conditions are satisfied and the vehicle data stored in the RAM 8 are now being recorded in the data recording unit 9. Then, the operational state ending process is executed since the operation of the recording apparatus 1 is still continued in the states other than "the completion of the data recording". More particularly, in the case of "in the collection of the vehicle data", the collection of the vehicle data is stopped. In contrast, in the case of "in the recording of the vehicle data", the collection of the vehicle data is stopped and also the unrecorded vehicle data are recorded in the data recording unit 9.

When the operational state ending process is executed, or when the data recording is completed, the recording apparatus 1 records the operational history composed of the parameter information and the state information in the data recording unit 9 based on the checked current operation state. The parameter information is the lowest minimum information required to restore the operation state, which is recorded at the time of end, at the time of a subsequent start. The acquired contents, the access address of the RAM 8, the acquiring conditions, etc., correspond to such informations. The state information gives the checked operational state of the recording apparatus 1. Any of the state "in the collection of the vehicle data", the state "in the recording of the vehicle data", or the state "the completion of the data recording" is recorded as such the informations. When the recording of the operational history is finished, the power supply is turned OFF and thus the shutdown process finishes.

In this manner, according to the present embodiment, the vehicle data containing the control parameters of the ECU 2 are acquired continuously based on the mode file. Then, the acquired vehicle data are recorded in the data recording unit 9 in accordance with the acquiring conditions. In other words, since the acquisition of the control parameters is still continued in the middle of the data recording, it is possible to suppress the occurrence of such a situation that the recording of the vehicle data is failed even in the case where the trigger conditions are continued. As a result, the vehicle data that are useful for identifying the faulty condition of the vehicle can be recorded without a fail, and thus an improvement of the reliability of the recorded data can be achieved.

Also, according to the present embodiment, the acquired contents and the acquiring conditions that are setted in response to the faulty condition of the vehicle are described in the mode file. Thus, the vehicle data necessary in identifying the faulty condition can be recorded effectively. In addition, according to the mode file, a series of the vehicle data that satisfy the predetermined acquiring conditions and are collected in a predetermined period are recorded in the data recording unit 9. Thus, the memory saving in the data recording unit 9 can be attained. Also, since the vehicle data are recorded in the data recording unit 9 while being correlated with a time information, the convenience in the data analysis can be improved. Meanwhile, if the recording mode is switched to a full-recording mode, all the vehicle data can be recorded irrespective of the acquiring conditions. Thus, the vehicle data can be recorded precisely rather than the memory-saving mode. Also, the recording apparatus 1 can inform the driver of the fact that the recording of necessary vehicle data has been completed, via the communication unit 11. As a result, in response to the completion of the recording, the driver can take the measures such as the driver carries the vehicle into the service shop, etc.

Further, the data recording unit 9 is not limited to the flash memory type memory card, and various recording media such as a magnetic recording medium, an optical recording medium, etc. may be applied widely. In this case, the vehicle data recorded in the RAM 8 are recorded on the recording media via various drives controlled by the CPU 6. As can be appreciated from the above, the data recording unit 9 in the present invention is not always provided as the constituent element of the recording apparatus 1. In other words, the recording apparatus 1 will suffice if such system can record the vehicle data at least on the data recording unit 9. In this case, it is not always needed that the data recording unit 9 should be detachably attached, and the data recording unit 9 may be provided integrally with the recording apparatus 1.

It will be understood to those skilled in the art that various modifications and variations can be made to the described preferred embodiments of the present invention without departing from the spirit or scope of the present invention. Thus, it is intended that the present invention cover all modifications and variations of this invention consistent with the scope of the appended claims and their equivalents.

What is claimed is:

1. A data recording apparatus for storing vehicle data comprising:

a first data recording unit;

a second data recording unit being accessible by an affiliated system;

a data acquiring unit for acquiring the vehicle data to the first data recording unit on a time-series basis; and a data controlling unit for recording a series of the vehicle data, that is recorded in the first data recording unit and satisfies predetermined acquiring conditions, in a predetermined period in the second data recording unit, wherein the data acquiring unit continues to acquire the vehicle data while the data controlling unit records the series of the vehicle data in the second data recording unit.

2. The data recording apparatus according to claim 1, wherein:

the data controlling unit has a full-recording mode where the series of the vehicle data are recorded in the second data recording unit irrespective of the acquiring conditions while being correlated with the time information, and can switch a recording mode to the full-recording mode.

3. The data recording apparatus according to claim 1, further comprising:

a communication unit for informing of completion of recording when the recording into the second data recording unit is completed.

4. The data recording apparatus according to claim 1, wherein:

the data acquiring unit further acquires values learned by the control unit and changed in response to a driving condition of the vehicle as the vehicle data.

5. The data recording apparatus according to claim 1, wherein:

the data acquiring unit further acquires peripheral information of the vehicle.

6. The data recording apparatus according to claim 1, wherein:

the vehicle data includes vehicle control parameters.

7. The data recording apparatus according to claim 1, further comprising:

means for temporarily fixing the data recording apparatus in a passenger compartment of the vehicle.

8. The data recording apparatus according to claim 1, wherein:

the second data recording unit comprises a portable memory storage device removably insertable into the data recording apparatus and the affiliated system.

9. The data recording apparatus according to claim 8, wherein:

the predetermined acquiring conditions are stored in a mode file on the portable memory storage device.

10. The data recording apparatus according to claim 1, wherein:

the recording of the series of the vehicle data is initiated prior to ignition of the vehicle.

11. The data recording apparatus according to claim 1, wherein:

the recording of the series of the vehicle data is initiated during ignition of the vehicle.

12. The data recording apparatus according to claim 1, wherein:

the recording of the series of the vehicle data is initiated when a driver's presence is detected by the vehicle.

13. The data recording apparatus according to claim 1, wherein:

the data acquiring unit discontinues acquiring data upon satisfaction of the predetermined acquiring conditions.

14. The data recording apparatus according to claim 1, wherein:

the second data recording unit continues to record the series of the vehicle data after a power supply from the vehicle is turned OFF.

15. The data recording apparatus according to claim 1, wherein:

the series of the vehicle data comprise time-series vehicle data and the data acquiring unit continues to acquire the vehicle data while the data controlling unit records the series of the vehicle data in the second data recording unit.

* * * * *